United States Patent Office 2,753,375
Patented July 3, 1956

2,753,375

METHOD OF PREPARING ACRYLAMIDE

Richard L. Webb, Noroton Heights, and Erwin L. Carpenter, Stamford, Conn., assignors to American Cyanamid Company, New York, N. Y., a corporation of Maine No Drawing. Application March 16, 1954,
Serial No. 416,686

5 Claims. (Cl. 260—561)

This invention relates to unsaturated organic amides. More particularly, it relates to the preparation of unsaturated organic amides, especially acrylamide. Still more particularly, it relates to the isolation of acrylamide from acrylamide sulfate.

Certain unsaturated organic amides have recently become of importance in various fields. Particularly is this true of acrylamide and its polymerization and copolymerization products. These products have been found useful, for instance, in the fields of adhesives, dispersants, fibers, plasticizers, surface coatings, thickening agents, as well as in the leather, paper, rubber, textile, and photographic arts. Because of these many potential applications there has been generated a great interest in improved processes for producing acrylamide.

One method of preparing unsaturated organic amides comprises hydration of the corresponding nitrile with concentrated sulfuric acid. The resulting product is the amide sulfate which must be further treated to isolate the free amide. In the case of amides insoluble in water, isolation is very easily accomplished by addition of the reaction mixture to excess water and/or ice. Acrylamide, however, is exceedingly soluble in water, about 200 gms. per 100 gms. of water at 30° C., and, accordingly, cannot be isolated in this manner.

Various procedures have been suggested for isolating water soluble acrylamide from acrylamide sulfate. One such procedure comprises treating an aqueous acrylamide sulfate solution with lime to remove the sulfuric acid as insoluble calcium sulfate. After separation, the aqueous acrylamide solution is concentrated and cooled to crystallize acrylamide which is then separated by conventional means. This process, however, is subject to certain disadvantages. For instance, because of the physical nature of the calcium sulfate cake, much dissolved acrylamide is retained by the latter when it is separated from solution. Accordingly, the initial concentration of amide in solution should be quite dilute and repeated washings of the cake must be made to recover retained amide. The ultimate and most serious disadvantage is that much time and effort must be spent in subsequent evaporation of the aqueous acrylamide solution to isolate solid acrylamide. A further disadvantage of the lime process lies in the fact that the calcium sulfate by-product is of little, if any, value.

Another proposal for isolating acrylamide comprises dissolving acrylamide sulfate in an organic solvent, such as isopropyl alcohol, in which ammonium sulfate is insoluble. Ammonium sulfate formed on addition of ammonia is separated, leaving acrylamide dissolved in the organic medium. This solution is then concentrated and cooled to isolate solid acrylamide. Although this procedure overcomes some of the disadvantages of the above described lime process, it also is subject to certain disadvantages. For instance, neutralization with ammonia is slow and incomplete. Accordingly, an excess of ammonia is required which results in side reactions with the amide. Additional by-products may also be formed by reaction of sulfuric acid with the alcohol. A still further disadvantage is the fact that the process necessarily requires a non-aqueous organic solvent with attendant high cost as well as toxicity, flammability, and recovery problems.

It is a primary object of this invention to provide a process for preparing acrylamide and in particular the isolation thereof from acrylamide sulfate. It is a further object of this invention to provide such a process which is free of the disadvantages and objections noted above. Such a process should be conducted in an aqueous medium. It should permit the treatment of highly concentrated acrylamide sulfate solutions. In addition, neutralization should be rapid and substantially complete, and should be obtained with an amount of neutralizing agent not substantially greater than that stoichiometrically required. Still further, such a process should not require solvent evaporation. Lastly, the neutralizing agent should be a readily available chemical obtainable in a highly purified state, and capable of recovery as a valuable and saleable product.

The above objects have been met by the process of this invention to a most surprising degree. Particularly is this true in view of the past belief that water soluble acrylamide could not without difficulty be recovered from acrylamide sulfate in an aqueous medium. It is indeed surprising, therefore, that the objects of this invention have been so successfully met by treating acrylamide sulfate in water.

It is well known that the solubility of ammonium sulfate in water increases considerably with increasing temperature, e. g., at 0° C. it is about 71 gms./100 gms. of water while at 50° C. it is about 84 gms./100 gms. The solubility of acrylamide in water also increases with temperature, the corresponding solubilities being 41 and 426 gms./100 gms. at 0° C. and 50° C. respectively. In accordance with the process of this invention it has now been unexpectedly discovered that, contrary to its behaviour in water, the solubility of ammonium sulfate in saturated or nearly saturated acrylamide solutions decreases markedly with increasing temperature, whereas the solubility of the acrylamide in saturated or nearly saturated ammonium sulfate solutions still increases with increasing temperature. Moreover, the solubility of ammonium sulfate in such acrylamide solutions is markedly lowered. Thus at 30° C., it is only 4 gms./100 gms. of solution saturated with acrylamide, and at 50° C. only 1 gm/100 gms. of solution saturated with acrylamide. Accordingly, it is possible to cool an aqueous solution initially saturated or nearly saturated with respect to both acrylamide and ammonium sulfate and thereby selectively crystallize the acrylamide.

In general, the process of this invention comprises reacting acrylamide sulfate with ammonia in water under such conditions that ammonium sulfate is thrown out as a crystalline solid while acrylamide remains dissolved in a single aqueous phase. Solid ammonium sulfate may then be separated, residual solution cooled to crystallize acrylamide, and the latter separated and dried.

Although the process has been described generally in quite a simple manner, there are certain factors which must be considered and limitations which must be observed for optimum recovery and purity of acrylamide.

Acrylamide sulfate treated in accordance with the process of this invention may be in any form and may have been derived from any process. It may, for instance be in the form of substantially pure acrylamide sulfate crystals. More likely, however, it will be in the form obtained from the particular process for preparing it, such as the viscous reaction product obtained by hydrating acrylonitrile with sulfuric acid and water. The process of this invention, therefore, may and usually will form an integral part of an overall process for forming the free amide by first preparing the amide sulfate.

Acrylamide sulfate, in whatever form, is added to water in which it is highly soluble. Preferably, simultaneous addition of ammonia as the neutralizing agent is also made. While simultaneous addition of reactants to the aqueous medium is not necessary, it is highly desirable since in this manner the hydrogen ion concentration may be simply controlled within limits for obtaining optimum results. Ammonia may be introduced in any of its forms. However, it is an advantage of this process that it may be introduced as an anhydrous gas and/or liquid. Introduction of ammonia is preferably conducted with agitation to provide maximum dispersion throughout the body of medium. Agitation may, of course, be conducted in any conventional manner.

For optimum isolation and recovery of free acrylamide the hydrogen ion concentration of the reaction mixture must be controlled within certain limits during the reaction of acrylamide sulfate with ammonia. It has been found that at a pH lower than about 2 and at a pH greater than about 7, various acrylamide by-products begin to form in aqueous acrylamide solutions. Although such formation is not too great at about pH's of 2 and 7, it rapidly becomes quite pronounced beyond this range. It is desirable, therefore, to maintain the hydrogen ion concentration of the reaction medium between a pH of from about 2 to about 7. Preferably, it should be from about 3.5 to about 6.5. By simultaneous addition of acrylamide sulfate and ammonia as described, the pH can be readily maintained within the desired limits.

Since the solubility of ammonium sulfate in substantially saturated aqueous acrylamide solution increases with decreasing temperature, selective crystallization of acrylamide from ammonium sulfate theoretically may occur over a wide range of temperatures. Preferably, separation of ammonium sulfate should be conducted within a temperature range of about 20° C. to about 60° C. By so operating it is possible to obtain a sharper separation since, as noted above, the solubility of ammonium sulfate in saturated acrylamide solution is exceedingly small within this range of temperatures. This has the advantage that mother liquor adhering to acrylamide crystals formed on cooling of the solution after ammonium sulfate separation is so nearly free of ammonium sulfate as to make the acrylamide directly useful in many applications without being subject to further purification.

While ammonium sulfate separation may be practiced with acrylamide solution initially saturated at temperatures highers than about 60° C., the rate of decrease of ammonium sulfate solubility is so small as to make substantially negligible any added advantage gained by operating at these higher temperatures. Similarly, the process may be operated with acrylamide solutions initially saturated at temperatures less than about 20° C. However, at these lower temperatures the solubility of ammonium sulfate in saturated acrylamide solution is relatively high while that of acrylamide in saturated ammonium sulfate solution is low. Moreover, the rate of decrease in solubility of acrylamide with decrease in temperature is small. Operating at lower temperatures, therefore, unduly restricts the initial acrylamide concentration and results in a small recovery of acrylamide crystals which, moreover, will have adhered thereto mother liquor high in ammonium sulfate.

Physical separation of solid ammonium sulfate from the aqueous acrylamide solution may be accomplished in any conventional manner such as by filtration, centrifuging and the like. The solids so obtained may then be washed with water or an aqueous solution of ammonium sulfate to recover any acrylamide. An advantage of the process of this invention lies in the fact that ammonium sulfate as compared, for instance, to calcium sulfate is not of such physical nature as to carry with it during its separation much of the aqueous acrylamide solution. Aqueous wash liquor so obtained may be recycled leaving a valuable by-product ammonium sulfate.

After separation of ammonium sulfate crystals at whatever temperature and by whatever means, residual solution may be cooled to precipitate acrylamide. Cooling may be conducted to the extent desired, it being limited only by the fact that the aqueous liquid phase be maintained. When treating acrylamide solutions initially saturated at temperatures within the preferred range of 20°–60° C., cooling will generally not be conducted below about 15°–20° C. It may very well, however, be conducted to as low as 0° C. and even lower although the small increase in recovery of acrylamide accordingly obtained may not be warranted. Inasmuch as the solubility of ammonium sulfate increases as the temperature is decreased there will be no further precipitation of ammonium sulfate. The resultant acrylamide crystals precipitated by cooling are substantially pure acrylamide. They may be separated by conventional means, and dried. An outstanding advantage of the present invention is that acrylamide may be crystallized from its aqueous solution by cooling without initially concentrating the solution by a costly evaporation procedure.

One additional feature should be noted with respect to ammonium sulfate separation. At whatever temperature separation is conducted, it is desirable that the solution be slightly less than saturated with respect to acrylamide. By operating in this manner premature crystallization of acrylamide will be avoided.

The process of this invention has been described to this point with the recovery of acrylamide as a solid. While this is the usual form in which the product is recovered, it may and often times will be recovered as a concentrated aqueous acrylamide solution. Such a solution may be obtained by cooling and diluting with water the aqueous acrylamide solution remaining after separation of ammonium sulfate. Dilution is generally carried out to provide an aqueous product having an acrylamide concentration of some 10–30%. This solution may then be employed without further purification as desired such as, for instance, in the preparation of polymers.

While the process of this invention may be conducted batchwise, it is most advantageously practiced on a continuous basis. When operating continuously, ammonium sulfate is recovered from the initially substantially saturated aqueous acrylamide slurry in any conventional manner such as centrifuging or filtration. Ammonium sulfate cake is washed and washings recycled. The aqueous acrylamide solution is then cooled to precipitate acrylamide which is separated also in a conventional manner. Residual solution is then recycled along with the washings. Crystals so obtained are substantially pure acrylamide. The overall recovery obtained when operating continuously is about 90–95%

The following examples will further describe the invention. These examples are illustrative only and not by way of limitation. Unless otherwise noted all parts are by weight.

*Example 1*

To 100 parts of water is added over a period of 55 minutes 326 parts of crude acrylamide sulfate (containing 124 parts of acrylamide) and 67 parts of gaseous ammonia at 50° C., the additions being simultaneous and at such rates that the pH of the reaction medium is maintained between 3–5. Resultant slurry is centrifuged to separate 238 parts of crude ammonium sulfate crystals. The filtrate, containing 104 parts of acrylamide is chilled to 0° C. and centrifuged to separate 57.5 parts of crystalline acrylamide having a purity of 98.2%. Mother liquor may be recycled as solvent for the next neutralization permitting additional recovery of acrylamide therefrom.

Example 2

To one hundred parts of an aqueous solution containing 53% acrylamide and 4% $(NH_4)_2SO_4$ is added at 50° C. over a period of one hour, 169 parts of a reaction mixture of acrylonitrile and concentrated $H_2SO_4$ simultaneously with 34.8 parts of gaseous $NH_3$ at rates such that the pH of the agitated slurry is maintained at about 4.0–6.5. The slurry is centrifuged at 42°–45° C. to remove solid $(NH_4)_2SO_4$, the cake washed with a small quantity of water, and washings added to the filtrate together with additional water to obtain 117 parts of acrylamide as a 20% aqueous solution. This aqueous solution may then be used in the preparation of polymers without further purification.

Example 3

To one hundred parts of water is simultaneously added at 50° C. and over a period of 55 minutes, 326 parts of crude acrylamide sulfate (containing 124 parts of acrylamide) and 67 parts of gaseous ammonium at rates so as to maintain the pH at about 3–5. The resulting slurry is centrifuged to separate crude ammonium sulfate crystals. The filtrate amounting to 209 parts and containing 105 parts of acrylamide is used as a reaction medium to which is added at 45° C. over a period of two hours 295 parts of a reaction mixture of acrylonitrile and concentrated sulfuric acid simultaneously with 61 parts of ammonia at such relative rates that the pH of the slurry is maintained between 3.0 and 5.0. The slurry is centrifuged to remove $(NH_4)_2SO_4$ at a temperature of 40° C., the filtrate cooled to 20° C. and centrifuged again to obtain 101 parts of crystalline acrylamide containing only 0.4% $(NH_4)_2SO_4$. The mother liquor is then reused as a reaction medium for further reaction of acrylamide sulfate and ammonia.

We claim:

1. A process for recovering monomeric acrylamide from acrylamide sulfate which comprises: neutralizing acrylamide sulfate with ammonia in an aqueous medium thereby precipitating ammonium sulfate giving a slurry comprising dissolved acrylamide and crystalline ammonium sulfate; the amount of ammonia being such as to neutralize substantially the entire sulfuric acid content of said acrylamide sulfate, and the amount of said acrylamide sulfate being such as to provide after neutralization a single aqueous phase substantially saturated with acrylamide at a temperature of at least 20° C.; maintaining the hydrogen ion concentration during neutralization at a range equivalent to a pH of about 2 to about 7, separating precipitated ammonium sulfate at a temperature of at least 20° C., cooling residual liquor to precipitate acrylamide, and separating precipitated acrylamide.

2. A process according to claim 1 in which the saturation temperature is about 20°–60° C. and the temperature at which ammonium sulfate separation is carried out is at least as high as the saturation temperature.

3. A process according to claim 2 in which the hydrogen ion concentration is maintained at a range equivalent to a pH of 3.5–6.5.

4. A process according to claim 3 in which acrylamide sulfate and ammonia are simultaneously added to said aqueous medium at a rate such as to maintain said pH range.

5. A process for recovering monomeric acrylamide from acrylamide sulfate which comprises: neutralizing acrylamide sulfate with ammonia in an aqueous medium thereby precipitating ammonium sulfate giving a slurry comprising dissolved acrylamide and crystalline ammonium sulfate; the amount of ammonia being such as to neutralize substantially the entire sulfuric acid content of said acrylamide sulfate, and the amount of said acrylamide sulfate being such as to provide after neutralization a single aqueous phase substantially saturated with acrylamide at a temperature of at least 20° C.; maintaining the hydrogen ion concentration during neutralization at a range equivalent to a pH of about 2 to about 7, separating precipitated ammonium sulfate at a temperature of at least 20° C., and diluting residual liquor to obtain a concentrated aqueous acrylamide solution.

References Cited in the file of this patent

UNITED STATES PATENTS

| | | |
|---|---|---|
| 2,140,469 | Crawford et al. | Dec. 13, 1938 |
| 2,431,468 | Davis et al. | Nov. 25, 1947 |
| 2,573,673 | Ritter | Oct. 30, 1951 |

FOREIGN PATENTS

| | | |
|---|---|---|
| 606,096 | Great Britain | Aug. 6, 1948 |
| 631,592 | Great Britain | Nov. 7, 1949 |
| 883,748 | Germany | July 20, 1953 |